US007724671B2

(12) United States Patent
Midtun et al.

(10) Patent No.: US 7,724,671 B2
(45) Date of Patent: May 25, 2010

(54) ARCHITECTURE FOR RESOURCE MANAGEMENT IN A TELECOMMUNICATIONS NETWORK

(75) Inventors: James Dean Midtun, Chandler, AZ (US); Ian Alexander O'Neil, Mesa, AZ (US)

(73) Assignee: Intel-Tel, Inc., Chandler, AZ (US)

( * ) Notice: Subject to any disclaimer, the term of this patent is extended or adjusted under 35 U.S.C. 154(b) by 2050 days.

(21) Appl. No.: 10/437,715

(22) Filed: May 13, 2003

(65) Prior Publication Data

US 2004/0228279 A1 Nov. 18, 2004

(51) Int. Cl.
*H04L 12/26* (2006.01)
(52) U.S. Cl. .................. 370/236; 370/352; 370/395.31; 379/225; 709/224
(58) Field of Classification Search ................ 370/236, 370/389, 241, 242, 253, 312, 352, 392, 395.31, 370/399, 402, 471, 349, 338, 254–258, 401; 709/223, 224, 243, 250, 203, 238; 379/221.01, 379/88.25, 225; 713/100; 455/554.1, 555
See application file for complete search history.

(56) References Cited

U.S. PATENT DOCUMENTS

| 5,544,163 | A | * | 8/1996 | Madonna | .................... | 370/352 |
| 5,577,033 | A | * | 11/1996 | Chang et al. | ................ | 370/402 |
| 5,577,042 | A | * | 11/1996 | McGraw et al. | ............. | 370/257 |
| 5,857,072 | A | * | 1/1999 | Crowle | ........................ | 709/203 |
| 6,333,931 | B1 | | 12/2001 | LaPier et al. | | |
| 6,338,112 | B1 | | 1/2002 | Wipfel et al. | | |
| 6,415,027 | B1 | * | 7/2002 | Malik | .................... | 379/221.01 |
| 6,542,499 | B1 | * | 4/2003 | Murphy et al. | ............... | 370/352 |
| 6,574,213 | B1 | * | 6/2003 | Anandakumar et al. | ..... | 370/349 |
| 6,791,949 | B1 | * | 9/2004 | Ryu et al. | .................... | 370/254 |
| 6,839,344 | B1 | * | 1/2005 | Couillaud et al. | ........... | 370/353 |
| 2001/0021247 | A1 | * | 9/2001 | Esfandiari et al. | ........... | 379/225 |
| 2001/0049730 | A1 | * | 12/2001 | Brendes et al. | ............. | 709/223 |
| 2003/0026410 | A1 | * | 2/2003 | Lumsden | ............... | 379/221.01 |
| 2004/0001485 | A1 | * | 1/2004 | Frick et al. | ................... | 370/389 |
| 2004/0125776 | A1 | * | 7/2004 | Haugli et al. | ............... | 370/338 |

OTHER PUBLICATIONS

"Sonet Telecommunications Standard Primer", Tektronix, Aug. 2001, pp. 24-25.*
Thomas Blain & Reginald Cable, Internet Protocol (IP Intelligent Network (IN) Integration, 1999Annual Review of Communications Executive Perspectives, Oct. 10, 1999 pp. 19-25.

* cited by examiner

*Primary Examiner*—Kwang B Yao
*Assistant Examiner*—Jeffrey M Rutkowski
(74) *Attorney, Agent, or Firm*—Michelle Whittington, Esq

(57) ABSTRACT

An architecture for resource management in a telecommunications network includes two or more nodes connected over a logically direct path in a peer-to-peer manner. At each node, local events typically trigger the node to transmit a broadcast to every other node. Broadcast information comprises a status of the local node's resources. Remote nodes receive the local node's broadcast and independently transmit their own broadcasts with similar information. Each node stores the received broadcast information in a local storage for future retrieval. When a session is desired with a remote node, the local node simply retrieves the remote node's resource status information from its local storage and determines if a session can occur. In this manner, every node of the network is aware of the nodal addresses of the other nodes, remote node's resource status, and can quickly retrieve, from its own local storage, the availability of the remote node's resources.

21 Claims, 4 Drawing Sheets

ARCHITECTURE FOR RESOURCE MANAGEMENT IN A TELECOMMUNICATIONS NETWORK

FIELD OF INVENTION

The present invention relates generally to resource management. In particular, the invention relates to an architecture for resource management in a telecommunications network and, more particularly, to a system and method of resource management of interconnected nodes in a telecommunication network using a specialized broadcast.

BACKGROUND OF THE INVENTION

Private Branch Exchange (PBX) systems provide telephone routing and message services to multiple users within the exchange. For example, typical PBX services include the delivery of external (outside the PBX) and internal (within the PBX) telephone calls, integrated voice mail, hands-free intercom calls, and various other call-center functions. Often times multiple PBX systems (i.e., "nodes") are connected together to form a telecommunications system network. This network is particularly useful for businesses having multiple offices in various locations, whereby each office has its own PBX (node) connected to the network. In this manner, intranetwork calls between nodes can be placed quickly and, depending upon the communication channel used, typically without toll or long-distance charges.

There are various techniques used to interconnect calling nodes. In the most straightforward manner, nodes are connected in a point-to-point network. In other words, each node of the network is connected to every other node of the network. For example, if there are five nodes in the network, Node 1 is connected to Nodes 2-5, Node 2 is connected to Nodes 1 and 3-5, Node 3 is connected to Nodes 1-2 and 4-5, and so on. Each new node must be connected to every other node of the network, thus, point-to-point topology rapidly becomes impractical as the number of nodes in the network increases.

Another approach uses a "tandem" technique to route calls from node to node in search of the intended or called party. For example, assume that there are five nodes in the network, and caller "A" of Node 1 is calling party "B" of Node 5. The call is routed to Node 2 to see if party "B" is a member of this node. When it is determined that party "B" is not a member of Node 2, the call is routed to Node 3 and a similar search is performed. When the call finally gets to Node 5, the call is connected to party "B" if the node has the available resource. Proportional to the number of nodes in the network is the number of "hops" from node to node. Thus, as the number of nodes increases, so does the "hopping time" needed to process the call.

Improved network architectures were needed to accommodate the growing number of telecommunication nodes. In 1980, the ITU defined the breakthrough Signaling System 7 standard ("SS7"). SS7 is an out-of-band protocol, meaning messaging signals travel on their own data path separate from the actual voice or data call. The messaging signals represent a "request for resources" or a query from one node to another. In this manner, "resources" represent the node's current capacity to accept and carry the type of call requested. For instance, if caller "A" of Node 1 is calling party "B" of Node 5, Node 1 will first send a query signal or "SS7 message" to Node 5 to see if Node 5 has the available resources required to accept the call. If the requested resource status is returned to Node 1 as "unavailable", then the call is not placed at that time, and caller "A" receives a status message containing further details. Coincidently, the availability of Node 5 to receive the call is determined without actually having to use a voice channel. If the query returns an "available" status from Node 5, a voice channel to Node 5 is reserved and the call is placed. Thus, prior to placing any call, an SS7 message must be sent and received to determine whether the recipient node has the available resources. The caller is not aware that call-set-up querying is occurring, only that there may be a noticeable delay in reaching the intended party.

The advent of combined voice and data communications over packet networks, such as the Internet using TCP/IP protocols, created problems for circuit-switched networks using SS7 protocols. In particular, in order for the two networks to communicate and route calls to each other, conversion gateways and the like had to be implemented. In 1996, the ITU defined H.323, a communications gateway standard to interface IP networks to the Public Switched Telephone Network (PSTN). Specifically, H.323 gateways digitize and compress voice calls from the PSTN into IP packets for routing over IP networks. A second H.323 gateway receives the IP packets and supports decoding the IP packets back to the PSTN. H.323 further defines a resource availability query to a remote node by sending a query to the particular node using the node's IP address. Similar to SS7, the resource query and response occurs at the time of the call (i.e., during call set up). Thus, the H.323 standard provides a manner in which circuit-switched networks and IP networks can communicate, however H.323 fails to improve the call-processing wait time and may even increase the time due to conversion delays and resource queries.

U.S. Pat. No. 6,333,931 issued to LaPier et al. discloses a conversion technique for interconnection between a data network, such as the Internet, and a circuit-switched network using SS7 protocols. Network interconnection is achieved using a protocol converter to convert SS7 signals to TCP/IP and back again. Similar to the H.323 standard, additional call-processing time is needed to convert the signals. Moreover, LaPier requires one or more signal converters to be added to the system, thereby increasing the overall cost of the system.

U.S. Pat. No. 6,415,027 issued to Malik provides a modified SS7 network having a dedicated call-routing server. Malik attempts to reduce traffic in the PSTN by routing calls through the server. Call-protocol signaling is not altered in the Malik system, so SS7 messaging still occurs. However, in the Malik system, after being notified that a subscriber has initiated a call, a resource query to a resource tracker is generated. The resource tracker is a centralized monitoring system that determines whether a call session has started or stopped and maintains an appropriate counter on a resource table. Similar to the SS7 protocol, the resource tracker checks the availability of resources for the called number and returns an appropriate response. Malik appears to avoid costly signal conversion techniques but continues to rely on time-delaying resource queries at the time of call set up.

U.S. Pat. No. 5,544,163 issued to Madonna uses a "ring" or "tile" topology to connect multiple nodes and manage their resources. Rather than using a resource query from one node to another node at the time of the call, the ring topology incorporates a modified tandem technique by "passing-the-packet" from node to node. For example, a first packet having an "empty" payload is passed from a first node to an adjacent node. The adjacent node determines the source of the packet and inserts information, if any, it has to send back to the first node. The packet is then passed to the next adjacent node, and the node inserts information and so on. The process is repeated at each node in the network until the packet traverses the complete network and returns with a "full" payload to the first node. Alternatively, each node can transmit its own "full" payload around the network that contains information originating from a single node. Each full packet is received at each node where the node determines whether any of the information in the packet is needed. Again, this process is repeated until each node on the network has transmitted its packets of information. The Madonna system and similar topologies fail to reduce call-processing wait times and are impractical for use in networks having many nodes. Additionally, the status of a node, including its resource availability, is included in a passed packet. By the time the packet gets passed around the network, the node may have changed its status and used up the resource it reported as available.

U.S. Pat. No. 6,338,112 issued to Wipfel et al. discloses a resource pool for managing available resources of a computing cluster. A cluster is a group of interconnected computers which can present a unified system image. Computers in the cluster typically share a disk, a disk array, or another nonvolatile memory. In a point-to-point manner, a node that needs resources sends a probe to a second node and receives a response to the availability of resources of the second node. This approach is not extendable beyond the needs of basic computing resources and devices as provided by operating systems. The Wipfel system is impractical for the specialized requirements of a high-efficiency communications network such as voice communication.

Accordingly, there is a need for an improved architecture for resource management that can support a large number of interconnected nodes. In addition, there is a need for rapid session processing and reduced session set-up times regardless of the number of nodes in the network. Moreover, there is a need for reliable resource management of interconnected nodes that reduces session processing time and network traffic.

SUMMARY OF THE INVENTION

A system for resource management in a telecommunications network includes a network channel and at least two nodes. The nodes include an access port to facilitate communications between the node and the network channel, a resource to accommodate a telecommunication session, and a storage having network addresses and statuses for all the nodes in the network. A broadcast originating from one of the nodes is transmitted to all the nodes in a peer-to-peer manner and stored locally in each node's storage. The broadcast includes a resource status of the originating node. In this manner, each node of the network is capable of transmitting and receiving a broadcast, storing the broadcast, and retrieving a current status of each node's resources.

In one embodiment, each of the nodes includes a network socket established for each of the other nodes in the network. The socket may include, for example, a TCP/IP or UDP socket.

In another embodiment, the system includes a non-IP node communicating indirectly over the network channel through one of the other nodes (directly connected to the network channel) in a piggyback manner.

In yet another embodiment, the broadcast includes a digital representation of the availability of resources. Still yet, the broadcast may include a percentage of the available resources for the transmitting node.

In still yet another embodiment, the system for resource management in a telecommunications network includes an IP network channel, a circuit-switched network, and at least two nodes configured to transmit over both types of networks and to transmit broadcasts. The nodes include an access port, an IP resource, a storage, and a backup strategy for initiating a session over the circuit-switched network when the recipient node has unavailable IP resources.

In one embodiment, the system includes a gateway configured to enable communications between the circuit-switched network and the IP network channel.

A method for establishing a session in a telecommunications network of the type having at least two nodes includes logically connecting the nodes in a peer-to-peer relationship. Information is broadcast between nodes and includes a current status of the resources available at the broadcasting node. Each node receives broadcasts from the other nodes independent of a query from any node and locally stores some or all of the broadcast information. From the stored information, the local node can determine if resources are available to accommodate a telecommunication session at another node and if so, can establish a session over the network.

In one embodiment, if no resources are available, the node can establish a session using an alternate mode of transmission.

A method of managing node resources in a telecommunications network having a local node and at least one remote node includes receiving, at the local node, broadcast information from a remote node indicating the current status of the remote node's resources. The broadcast is received independent of a query from the local node. The local node stores the information in a local memory and determines from the stored information if the remote node has resources available to accommodate a telecommunication session. The local node also determines if an event at the local node has occurred and if so, and in response to the event, the local node transmits a broadcast. The broadcast is independent of a query from a remote node and includes the current status of the local node's resources. A session may be initiated between the local and remote nodes if the stored information indicates the remote node has resources available and the local node has resources available.

BRIEF DESCRIPTION OF THE DRAWINGS

These and other features, aspects, and advantages of the present invention may be best understood by reference to the following description taken in conjunction with the accompanying drawings, wherein like reference numerals indicate similar elements.

DETAILED DESCRIPTION

The invention provides an improved architecture for resource management in a telecommunications system by, for example, providing a specialized broadcast protocol from each node indicating its resource status to every other node in the system. In this manner, each node maintains routing addresses for all the other nodes in the network to transmit resource updates. A local memory at each node provides storage of network addresses and data. A quick local retrieval of the available resources of neighboring nodes replaces the conventional query/response messaging from node to node. As a result, the systems and methods of the present invention eliminate resource querying across the network at the time of the call, reduce network signaling traffic, reduce call placement time, and use logical rather than physical network connections for updates and messaging thereby enabling larger numbers of nodes to connect to the network.

The systems and methods of the invention have particular usefulness in the management of node resources (both local and remote) and therefore are conveniently described in that context. However, as will be apparent from the following disclosure, the invention has various other applications useful in call processing, such as notification of node status in general (e.g., online/offline), diagnostic reporting of a node and/or network, updating node addresses, statistical information on node availability, and any other node or network information which may be in a broadcast from one node to all the other nodes of a network.

DEFINITIONS

Used herein, "broadcast" means one or more substantially simultaneous signals sent from one node to the other nodes in the network without having to "hop through" each node. A signal is sent from an originating node to all the other nodes in the network on a peer-to-peer basis or from the originating node to each node in a logically direct path. In general, broadcasts are triggered by events occurring at the node.

Used herein, "event" means a condition, situation or change of the node's status that generally triggers a result, such as a broadcast. For example, possible events include a change in the status of a node's IP resource, statistical report of the node's resources, availability of the node to accept a session (i.e., online/offline), and resource's being added or eliminated from a node.

Used herein, "resource" means the nodes capacity to accommodate a session. Accommodation may include the ability to accept, support, and carry an incoming session or an outgoing session, such as an audio or data stream.

Used herein, "session" means a dedicated telecommunications pathway between two nodes supporting the flow of data from node to node. Sessions represent any suitable communication occurring between nodes and may include a voice call, voice data, multimedia data, imaging, and specific query for statistical, diagnostic, or bulk data transfer.

Exemplary Architecure for Resource Management

Figure 1:
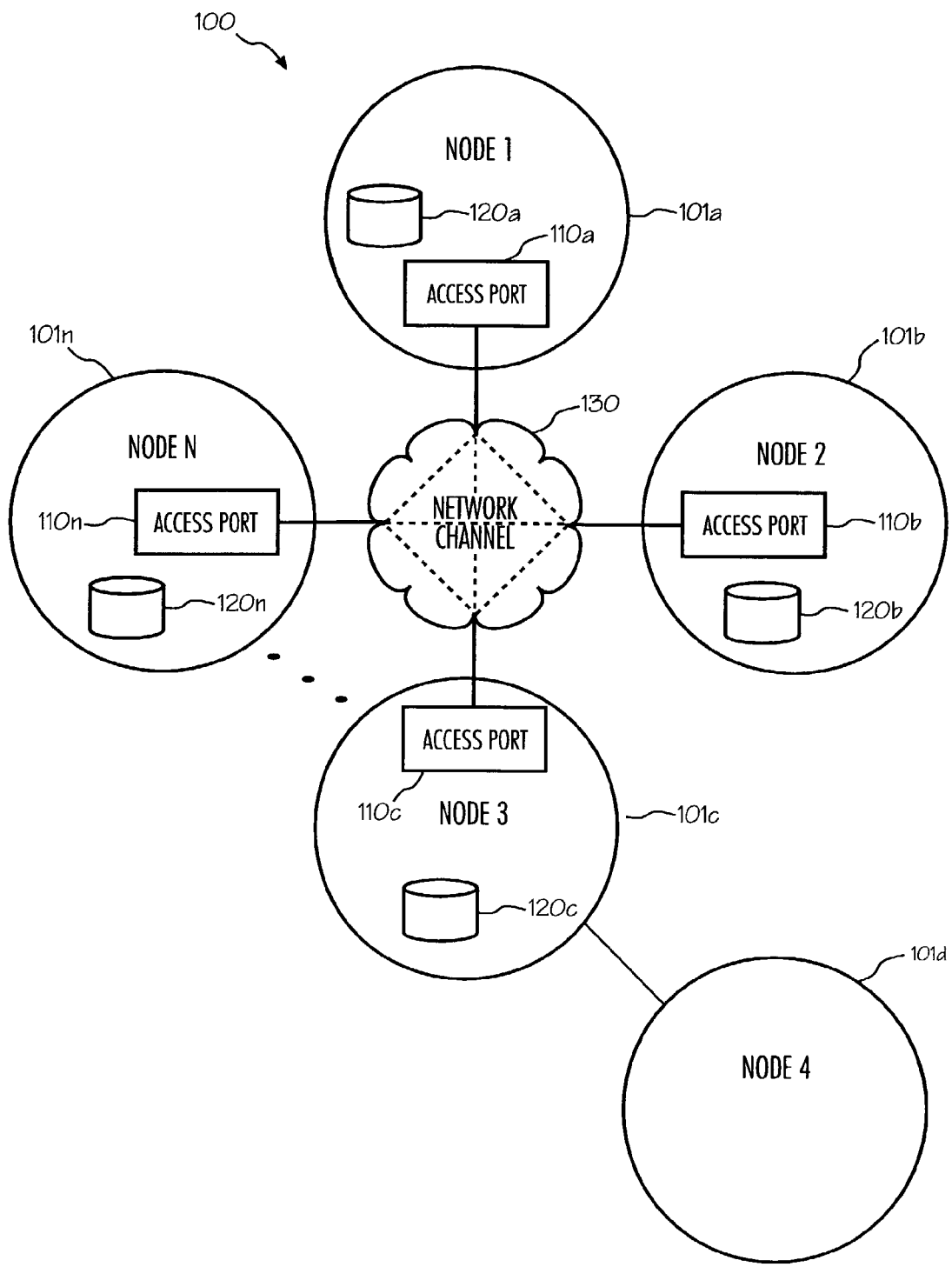
FIG. 1 illustrates an architecture for resource management in a telecommunication network in accordance with one embodiment of the invention.

FIG. 1 illustrates an architecture for resource management in a telecommunication network in accordance with one embodiment of the invention. Exemplary network or system 100 includes two or more Nodes 101a-101n, and a network channel 130. Network channel 130 preferably includes a suitable packet-based network, the Internet, wide area network, wireless network, asynchronous transfer mode, and/or specialized carrier.

Nodes 101 include any telecommunications grouping of endpoints, such as a PBX (Private Branch Exchange), having a centralized call processor for managing endpoint calls. It should be appreciated that endpoints may include telephones, keysets, personal computers, computing devices, wireless remote clients and any combination of the like. The general structure and/or functional aspects of PBXs or similar systems are well known in the communications industry and therefore will not be discussed in detail.

Nodes 101 generally include an access port 110 and a storage 120, as well as various other elements which are generally known and will not be discussed. Access port 110 may include any suitable means for facilitating network access between the node and the network. For example, access port 110 may include a network system interface in the form of a circuit card. Interface cards allow communications travel to and from the IP network and are generally well known in the communications industry. One particular card called an Internet Protocol Resource Card (IPRC) uniquely combines the network interfacing and the node resource. Nodes may include one or more IPRCs, but preferably the available resources are combined into node groups. Node groups or IP connection groups will be discussed in detail below.

Typical node resources include digital signal processors (DSPs), port devices, shared call-processing resources, signal sources and socket resources. In one particular embodiment, the node may include an IPRC to facilitate access to an IP network and one or more DSPs. The DSPs receive digital signals from the IP network and process the signals for use within the node. In this manner, the number of available resources directly corresponds to the number of available DSPs. Each incoming session likely reduces the number of available resources and conversely, terminated sessions likely free up resources and increase the available number of resources.

Storage 120 includes any suitable storage means such as a disk-based database, memory, removable media, and/or data logging devices. It should be appreciated that nodes 101 may include multiple memory elements used for storing a variety of data within the node. Additionally, it should be appreciated that storage 120 may include one or more storage elements capable of storing data immediately relevant to the invention as discussed herein, as well as various other data.

In a preferred embodiment, storage 120 of each node 101 stores a list of addresses to define the signaling paths to all the other nodes in network 100. For example, Node 1 contains a list of IP addresses for Nodes 2-N; Node 2 contains a list of IP addresses for Nodes 1 and 3-N; and so on. Unlike a traditional ISDN (integrated services digital network), network 100 does not include a central server or manager where all communications must flow through. Rather, each of the nodes in network 100 can directly communicate with every other node in a general peer-to-peer or point-to-point nature, without hops or intermediate processing. This technique is represented in network 100 by the dashed lines through network channel 130.

In one particular embodiment, access port 110 includes one or more IPRCs that correspond to an IP address thus, nodes having multiple IPRCs (or the like) will have multiple IP addresses. Since each node is aware of all the other nodes' IPRCs or resources, management of individual IPRCs can become troublesome in large networks. To accommodate the growing network and simplify programming, network 100 of the invention may combine the devices containing resources (e.g., IPRCs) of the node into groups. These "node connection groups" allow the installer to program all destination IP parameters, enumerating each IPRC along with its IP address, for a particular node at one location. Node grouping may further allow the installer to program network routing on a "node level" instead of an individual IPRC level, and program call configuration parameters into one connection group. Node connection groups essentially combine the resources of the node regardless of the number of IPRCs, or the like, existing at the node. Node groups may also simplify reporting the status of resources.

Nodes having multiple resources, such as multiple IPRCs, may attempt to balance the load on the cards by dividing resources among the various other nodes in the network. In other words, if there are three nodes in the network (Nodes 1-3), and Node 1 has two IPRCs, then Node 1 may reserve one card for communication between itself and Node 2 and reserve the other card for communication between itself and Node 3.

In one particular embodiment of the invention, each node 101 creates sockets with every other node in the system. The network may support various types of data transfer protocols as well as data packets, such as TCP/IP and UDP (user-defined protocol). In order to reduce the memory needed, only one such socket connection is established to each remote node, even if the local node contains several IPRCs designated for private networking. A node table may define the network structure and each node will know how to connect to each other node both when erecting the mesh of communications links and during operations. During an exemplary initialization sequence, the various connections between the nodes are established using logically defined sockets. A logical point-to-point structure is created for communication between two particular nodes. Because the point-to-point structure is not physically implemented, but only logically constructed using packet addresses, the complexity of the system is limited to the address lists stored in local storage 120. Consequently, when a node transmits a broadcast signal (e.g., at the time of an event), the node can generate IP messages as a multiple packet broadcast. These packets are sent to all the node addresses on file in the node's storage 120. In this manner, all nodes in the network constantly maintain current updates of resource availability changes occurring within the network.

As previously stated, each node 101 suitably broadcasts the availability of resources to every other node in network 100. Node 101 and in particular storage 120 stores the broadcast information received from the remote node. A quick local lookup of the status of the remote node allows a transmitting node to determine if the remote node has the resource available to accept a session. Additional detail regarding broadcasts and a node's dissemination of information is discussed below.

Another advantage realized by the invention is the ability to mix packet and nonpacket transmitting nodes in a single network. Some nodes, e.g., Node 4 of FIG. 1, may not be setup to accept and transmit packet communications over an IP network. Yet, regardless of the transmission capabilities of Node 4, this node is still a participant of the node community represented by exemplary network 100. Node 4 may be linked to Node 3 in a traditional nonpacket manner, such as T1/E1/Gateway, while Node 3 is connected to packet network channel 130. Communications directed to or from Node 4 are essentially routed through Node 3 in a piggyback manner. In other words, intranetwork communications to and from Node 4 are routed through Node 3. Node 4 does not participate in sending broadcasts since the broadcasts generally indicate the availability of IP resources and Node 4 does not yet have this capability. Moreover, Node 4 typically does not include storage 120 for the purposes of storing IP addresses and remote resource information; however, it should be appreciated that Node 4 may include storage or memory capabilities as associated with typical node functions. At some time if Node 4 is able to hook directly to network channel 130, the connection between Node 4 and Node 3 may be eliminated or at least not used unless needed, e.g., as a backup. Additionally, when Node 4 connects directly to the packet network, Node 4 can be easily programmed using the existing connection between Node 4 and Node 3. Thus, both packet and non-packet nodes can be added to the network seamlessly and without disrupting the remaining nodes.

Figure 2:
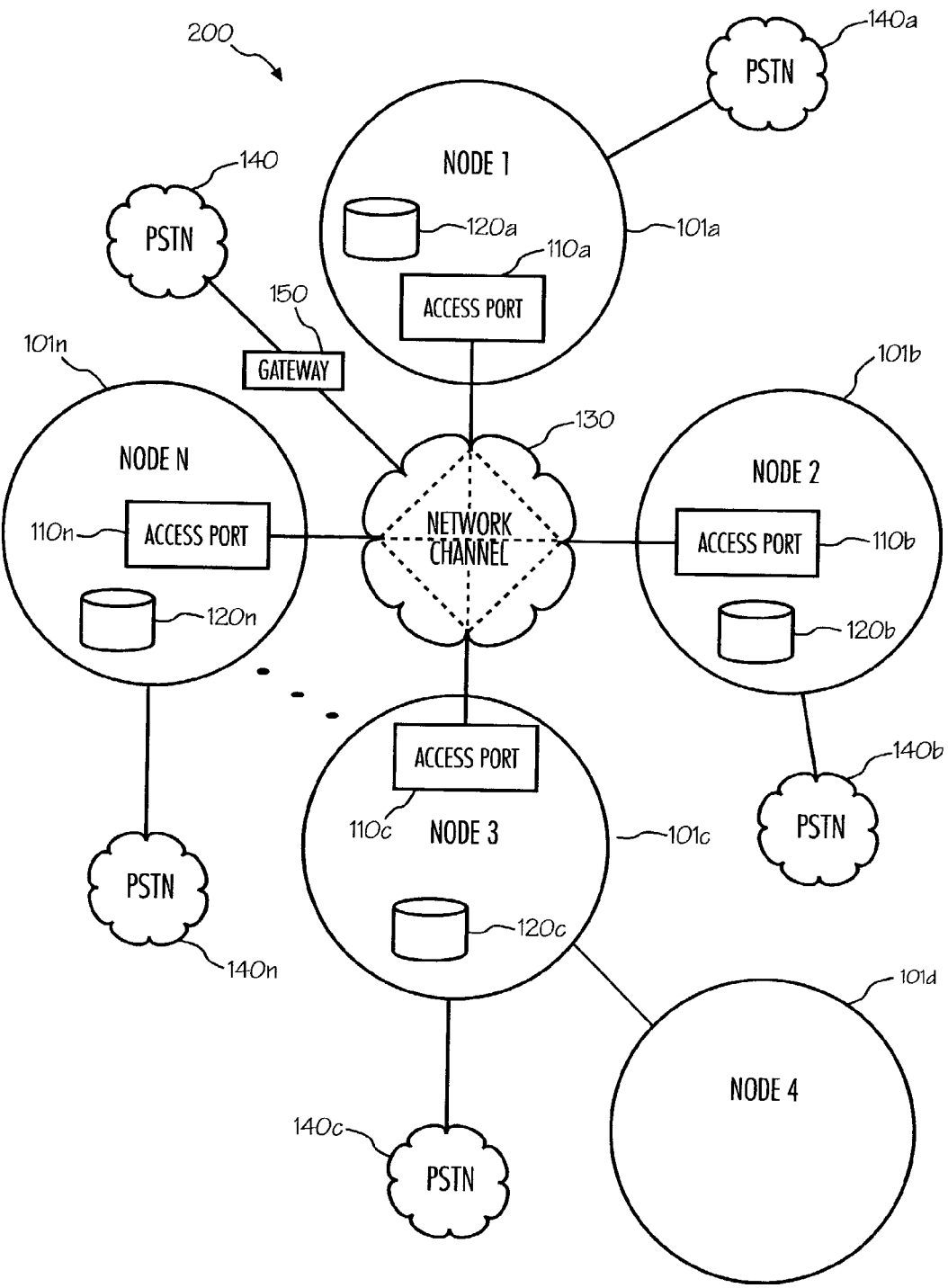
FIG. 2 illustrates another architecture for resource management in a telecommunication network in accordance with another embodiment of the invention.

FIG. 2 illustrates another architecture for call processing in a telecommunication network in accordance with another embodiment of the invention. Exemplary network 200 includes all the same elements as previously discussed network 100 and further includes a PSTN (Public Switch Telephone Network) 140, 140a-n, and a gateway 150. Network 200 provides a versatile architecture such that a combination of packet network and traditional circuit-switching is permissible. While the advantages of permitting multiple transmission methods may be readily apparent to one skilled in the telecommunications industry, nonetheless it is desirable to discuss some of these benefits. Preferably, telecommunication sessions between nodes occur over packet-based network channel 130. However, if a remote node has notified the local node of the lack of IP resources, the local node can implement its backup plan, if any. For instance, a programmer can establish a hierarchy of session placement for each node within the network. The first option may be to use the packet network and if that fails or is unavailable, the next option may be to use the traditional circuit-switched network (e.g., PSTN 140), and if both these options are unavailable, a "camp-on queue" at the local node may occur. In this manner, since the communication paths for the traditional circuit-switched network are often times already in place, using the traditional network as a back-up system provides a cost-effective option.

Generally, each node 101 has a connection to PSTN 140. It should be realized that PSTN 140 may be the same or different networks that are suitable for traditional circuit-switched communications. Each node 101 preferably includes an integrated interface or gateway (not shown on FIG. 2), such as an interface circuit card, to facilitate communications between the PSTN and the node. However, there may be situations where a gateway similar in nature to gateway 150 is coupled between a node and PSTN 140.

Gateway 150 receives data from PSTN 140 and network channel 130 and enables the communications between the two networks having different communication protocols. Although not shown on the current figure, it should also be appreciated that gateway 150 may receive data from various other types of networks, such as wireless networks, cell phones and other hand-held communication devices, and facilitate the communication to/from network channel 130. For example, In general, the structure and function of gateways, such as gateway 150, are well known in the communications industry and therefore will not be discussed in detail herein. It should be noted, however, that in one particular embodiment of the invention, gateway 150 may receive broadcast signals from one or more of nodes 101 and in turn, broadcast information to PSTN 140 of the availability of resources of network 100 or store the broadcast information for retrieval upon request.

Sessions initiated from within network 100 and directed to recipients outside network 100 (and vice versa), are typically routed through PSTN 140 and may or may not be routed through network channel 130. For example, if an outside network session is requested with Node 1 of network 100, Node 1 can accept the session and allocate an IP resource. In this manner, the data may be transmitted through PSTN 140, gateway 150, network channel 130 to Node 1. Gateway 150 may use a table-lookup scheme to identify the recipient's IP address to send the data over network channel 130 to Node 1.

Alternatively, the data may arrive from PSTN 140*a* directly to Node 1 and Node 1's internal gateway will suitably process the data. Regardless of how the IP resource is allocated (e.g., to a network 100 node or outside the network), if the allocation causes an event within Node 1, Node 1 will send a broadcast indicating the status of Node 1 IP resources.

Exemplary Flowcharts for Resource Management

The various operations of the present invention will now be discussed to further facilitate understanding of the invention and its best mode. It should be appreciated that the particular implementations shown and described are illustrative of embodiments of the invention (including its best mode) and are not intended to limit the scope of the present invention in any way.

Figure 3:
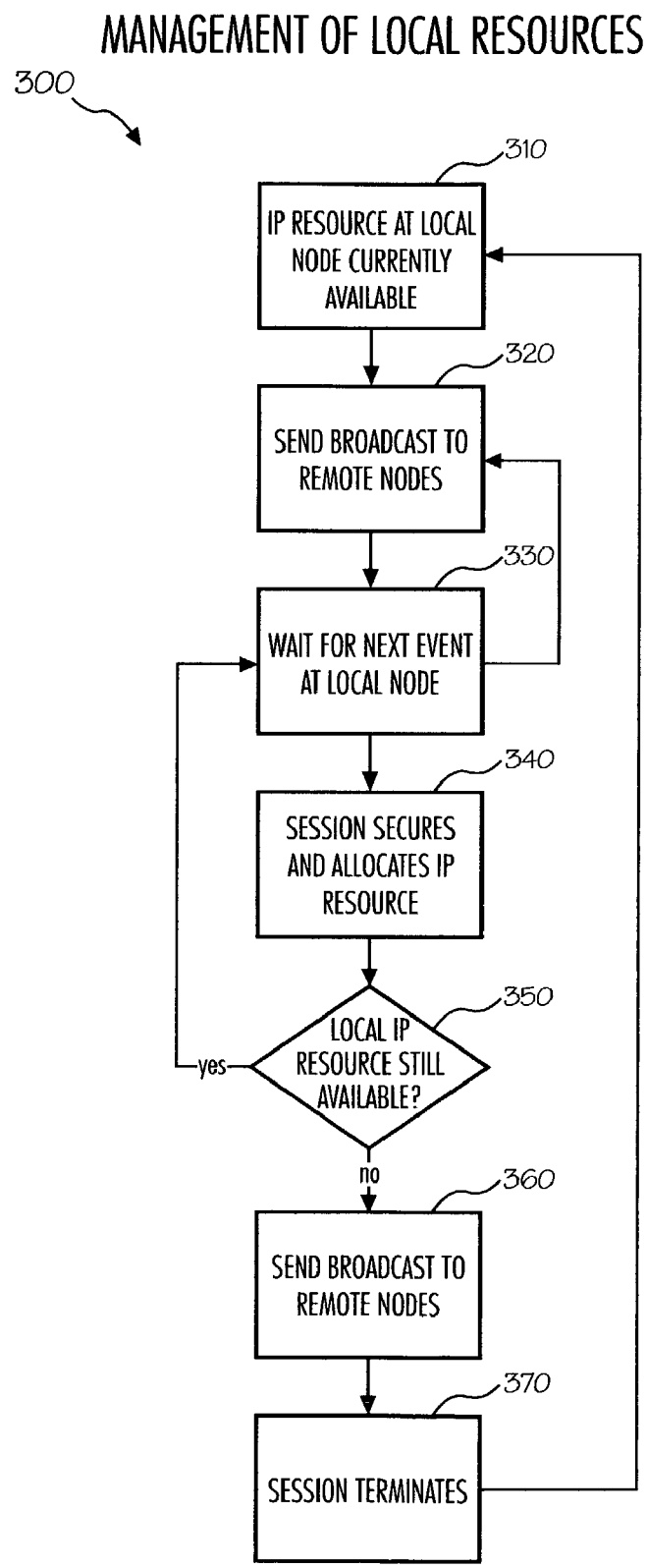
FIG. 3 is an exemplary flow chart for management of local resources at a local node in accordance with an embodiment of the invention.

FIG. 3 is a flow chart of the operation of an architecture for call processing in a telecommunication network, e.g., exemplary networks 100 and 200, in accordance with one embodiment of the invention. In particular, flow chart 300 is an exemplary process for management of local resources at a local node in accordance with an embodiment of the invention. Initially, an IP resource becomes available at the local node (step 310). There are numerous circumstances in which resources at the local node may become available. For instance, the node's resources may become available when the node joins the network for the first time, or an additional resource such as another IPRC is added to the node, or in a node bootup situation. Additionally, when a current session terminates (e.g., a communication between the local node and a remote node), the allocated resource becomes available.

In general, an event, such as when an IP resource becomes available, triggers the node to send a broadcast to the remote nodes (step 320). The local node retrieves the IP addresses of the remote nodes of the network from a local memory, such as storage 120. The broadcast may be transmitted by and through access port 110. The broadcast informs the nodes in the network that the local node now has available resource(s) and can accept incoming calls. The remote nodes may confirm the receipt of the broadcast, however in order to reduce network traffic, a return confirmation may not be desirable. The local node then waits for the next event to occur (step 330). Upon notification of a session, either initiated by a remote node or the local node, an available IP resource may be secured and allocated (step 340).

The node may include suitable programming for monitoring the number of IP resources available for incoming and outgoing sessions. The local node generally queries if there are any available IP resources remaining after the current resource allocation (step 350). As previously stated, an event generally triggers a broadcast, however there may be occasions when an event such as allocation of an IP resource does not trigger a broadcast. For example, if there are multiple IP resources available and only one resource is allocated, the node may have available resources remaining and therefore may not send a broadcast. In yet another embodiment, the node may include a threshold value that determines whether resources are still available. For example, the threshold may be met if a certain percentage of resources have been allocated, e.g., 90% allocated. A broadcast may be triggered at 90% rather than at 100% allocation of resources. Alternatively, the node may simply have an "all" available or "none" available triggering scheme. In other words, if even one resource is available, then the node broadcasts a notification that resources are available. This technique may be implemented, for example, by characterizing "available resources" as a "1" and "not available resources" as a "0". In this manner, when availability of the local node changes from "0" to "1" or "1" to "0", an event occurs and a broadcast is sent from the local node.

If the local node continues to have resources available, then the node continues to wait for the next event to occur (step 330). In another embodiment, the node may send a broadcast indicating the number of resources remaining (repeat step 320; not shown on FIG. 2).

If, however, there are no remaining resources, then the local node sends a broadcast to the remote nodes indicating that all the resources for the local node are allocated or otherwise not available (step 360). This broadcast is similar in nature as the previously described broadcast except that it indicates no resources are currently available at the local node. When a session terminates (step 370) and/or an IP resource becomes available (step 310), the local node repeats the described management process and once again sends a broadcast to all the remote nodes in the network to indicate the update in status, i.e., resources available to initiate a session.

Figure 4:
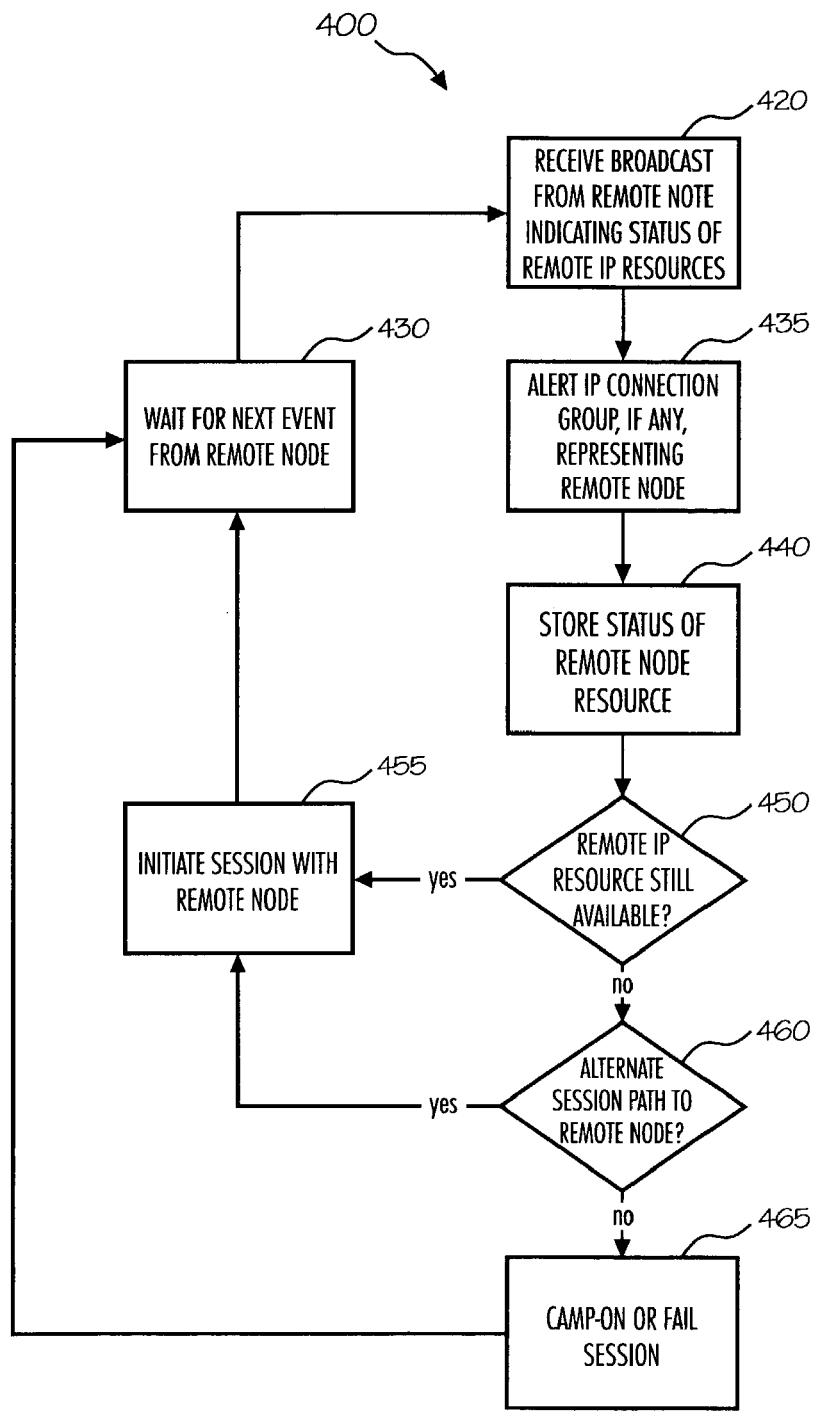
FIG. 4 is an exemplary flow chart for management of remote resources at a local node in accordance with an embodiment of the invention.

FIG. 4 is another flow chart of the operation of an architecture for call processing in a telecommunication network, e.g., exemplary networks 100 and 200, in accordance with another embodiment of the invention. In particular, flow chart 400 is an exemplary process for management of remote resources at a local node in accordance with an embodiment of the invention. Initially, the local node receives a broadcast from a remote node indicating the status of the remote node's IP resources, e.g., resources available, resources not available, the number of available resources, etc., (step 420). The broadcast received is similar in nature to a broadcast sent by the local node and may be received by and through access port 110.

Once a broadcast is received, the local node begins processing the information contained within the broadcast and responds accordingly. If the remote node has an IP connection or node group (as previously discussed), then the group is made aware of the change in status or current status of the remote node's resources (step 435). Of course, if the remote node does not have a grouping of resources, then this step may be generally omitted. The current status of the remote node's IP resources is stored in a suitable memory element, such as storage 120 (step 440). In addition, any other information received from the broadcast may be stored at the local node, such as updated IP addresses, additional IP addresses, statistical data to further evaluate resources, and diagnostic information. It should be realized that the order of the steps of the flow charts may not be indicative of the actual order of the process. For example, the information received from the remote node may be stored in the local memory prior to alerting an IP connection group.

The local node may then query whether or not the remote node has available resources remaining (step 450). As previously discussed, the remote node and/or network may have an "all-or-nothing" methodology when reporting available resources. In this manner, the broadcast received may indicate "resources available" or "resources not available." Alternatively, the broadcast may include information on the number of available resources remaining, and/or a percentage of used/taken resources, and/or a percentage of remaining resources. In still another embodiment, the local node may include programming to determine the probability that a session between the local node and remote node can or will occur based on the availability of resources received from the remote node. As one skilled in the art will readily notice, similar to the broadcast sent from the local node, the broadcasts received from the remote nodes may include any number of techniques for indicating the status of the remote node's resources.

Based on the stored information, if the remote node has resources remaining, then the local node can initiate a session with the remote node as needed (step 455). In the situation where a node begins transmission of data for a session and encounters the glare situation that the remote node is out of resources, the remote node generally rejects the incoming session. The initiating node receives information back from the remote node that the session was rejected and/or the remote node is out of resources. At that time, the node may update its own local memory that the remote node is out of resources without having to wait for a broadcast from the remote node. In one embodiment, when the local node initiates a session with a remote node (or if the remote node initiates), the nodes may perform a final status check of resources prior to securing and/or accepting a session. If the resources are still available, then the session is consummated. Although post-setup of the session is beyond the scope of this application, it is worth mentioning that even during negotiations of a session and during an actual session, nodes are still receiving and transmitting broadcast information.

Based on the stored information at the local node, if the remote node no longer has available IP resources, then the local node determines whether there is an alternate transmission path for hosting a session to the remote node (step 460). As previously mentioned, the local node may include alternate paths for session transmission when there are no available remote IP resources or if the local node no longer has IP resources available. If there is an alternate session path from the local node to the remote node, then the local node can initiate a session with the remote node as needed (step 455). If, however, there is not an alternate session path established or available from the local node to the remote node, then a session to the remote node generally will not occur. The local and/or remote nodes or the network may have options available for the local node when a session cannot be consummated (step 465). For example, the local node may camp-on to the remote node until a resource becomes available or the local node may simply receive a "failed session" notification.

In general, the local node is constantly waiting for the next event to occur at the remote node (step 430). In other words, the local node continually has an open broadcast channel available from the remote node(s). Because of the logical IP connections between the nodes, and in particular the established IP sockets, communication lines are always in an "open" state. Even during an ongoing session, the local node can continue to receive broadcast information from the remote nodes because over the packet-based network, broadcast information and session data information are generally tagged differently. For example, even if the two types of information are transmitting over the same virtual packet network, the broadcast packets having an appropriate header may be arriving intermingled with ongoing session packets from the same or different remote node. In this manner, the local node receives data from all the nodes continuously and sorts through the incoming data to act accordingly. Alternate techniques for receiving the data at the local node may include dedicated channels within the network channel for receiving the broadcasts and for receiving the session data.

In another embodiment of the invention, the local node may receive and transmit replicated information for distribution among the entire network. In this manner, a broadcast may include information containing updated data from one node and replicated to the other nodes to ensure the entire network has the most recent network information. Replicated information may include any data pertinent to the operation of a telecommunications network, such as networks 100 and 200, and may include, administrative updates to node programming and addresses. This replication service helps to ensure that all the nodes have received the most recent information from the other nodes. In addition, distributing replicated information among all the nodes of the network helps to reduce programming errors that may occur when a new node is added to the network.

For the sake of brevity, conventional techniques for signal processing, data transmission, signaling, and network control, and other functional aspects of the systems (and components of the individual operating components of the systems) may not be described or illustrated in detail herein. Furthermore, the connecting lines shown in the various figures contained herein are intended to represent exemplary functional relationships between the various elements. It should be noted that many alternative or additional functional relationships and/or physical connections may be present in a practical telecommunications system.

Presented herein are various methods and techniques for monitoring and reporting the availability of resources, including the best mode. Having read this disclosure, one skilled in the industry may contemplate other similar techniques, modifications of structure, arrangements, proportions, elements, materials, and components for managing the availability of resources that fall within the scope of the present invention. These and other changes or modifications are intended to be included within the scope of the present invention, as expressed in the following claims.

The invention claimed is:

1. A system for resource management in a telecommunication network comprising:
   a network channel enabled to transmit telecommunication data within the network;
   at least two nodes coupled to said network channel, wherein each of the nodes comprises,
      a private branch exchange,
      an access port to facilitate communications between the node and the network channel,
      a resource to accommodate a telecommunication session, and
      a storage comprising a network address for each of the nodes in said network and a resource status for each of the nodes; and
   a peer-to-peer broadcast originating from one of the nodes and transmitted to each of the nodes in a logically direct path, said broadcast comprising said resource status of at least the originating node,
   whereby, each of the nodes are enabled to transmit and receive the broadcast, store the broadcast, and retrieve from a local storage a current status of each of the node's resources.

2. The system of claim 1, wherein each of the nodes further comprises a network socket established for each of the other nodes.

3. The system of claim 2, wherein said network socket comprises a TCP/IP socket.

4. The system of claim 2, wherein said network socket comprises a UDP socket.

5. The system of claim 1, wherein said access port and said resource comprise a single circuit card.

6. The system of claim 1, wherein said resource comprises a DSP.

7. The system of claim 1, wherein said broadcast is triggered by a node event.

8. The system of claim 1, further comprising one IP node and one non-IP node, said non-IP node communicating indirectly over said network channel through said IP node in a piggyback manner.

9. The system of claim 1, wherein said broadcast comprises a replication of at least some of the originating node's storage.

10. A system for resource management in a telecommunication network comprising:
   a packet-based network enabled to transmit telecommunication data within the network;
   at least two IP nodes configured to transmit packet data over the network channel,
      wherein each of the IP nodes comprises,
      a private branch exchange,
      an access port to facilitate communications between the IP node and the network channel,
      an IP resource to accommodate a telecommunication session, and
      a storage comprising a network address for each of the IP nodes in said network and an IP resource status for each of the nodes;
   a non-IP node incapable of direct communication over said packet-based network channel, said non-IP node communicating through one of said IP nodes in a piggyback manner, said non-IP node having a resource to accommodate said telecommunication session; and
   a peer-to-peer broadcast originating from one of the IP nodes and transmitted to each of the IP nodes in a logically direct path, said broadcast comprising said IP resource status of at least the originating node,
   whereby, each of the IP nodes is enabled to transmit and receive the broadcast, store the broadcast, and retrieve from its storage a current status of each of the IP node's resources.

11. The system of claim 10, wherein said broadcast comprises a digital representation of availability of resources.

12. A method for establishing a session in a telecommunication network, said network of the type having at least two nodes and each node comprising a switch, said method comprising:
   connecting said nodes in a peer-to-peer relationship over a network channel such that a logically direct path is established between each of said nodes;
   broadcasting information from each node over said logically direct path, said information comprising a current status of resources available at the node;
   receiving at each node a broadcast information from the other nodes, said received information comprising an indication of the current status of resources available at the other nodes, said broadcast occurring independent of a query from any node;
   storing said received broadcast information at each node in a local node storage for future lookup;
   determining from said locally stored information if resources are available to accommodate a telecommunication session; and
   establishing said session over said network channel if resources are available.

13. The method of claim 12, wherein each of said nodes establishes a network socket corresponding to each of the other nodes in the network.

14. The method of claim 12, further comprising, if no resources are available, establishing a session using an alternate mode of transmission.

15. The method of claim 12, wherein said information comprises a replication of at least some of the originating node's storage.

16. A method of managing node resources in a telecommunication network, said network comprising a local node having a switch and at least one remote node, said method comprising:
   at said local node,
   receiving a broadcast information from a remote node over a logically direct path, said broadcast information received independent of a query from said local mode, said information comprising a current status of resources of said remote node;
   storing said information in a local memory of said local node;
   determining from said stored information if said remote node has resources available to accommodate a telecommunication session between said local node and said remote node;
   determining if an event at said local node has occurred;
   in response to an event occurring, transmitting to said remote node a broadcast over said logically direct path comprising a current status of resources at said local node, said broadcast independent of a query from said remote node; and
   initiating said session with said remote node if said stored information indicates said node has resources available and said local node has resources available.

17. The method of claim 16, further comprising establishing an IP socket at said local node corresponding to said remote node.

18. The method of claim 16, wherein said event comprises a change in the status of resources.

19. The method of claim 16, wherein said receiving and transmitting occurs in a peer-to-peer relationship between said nodes.

20. The method of claim 16, further comprising initiating an alternate mode of session transmission with said remote node if said stored information indicates said remote node has no available resources.

21. The method of claim 16, wherein said broadcast comprises a replication of at least some of a local memory of said remote node.

* * * * *